(12) United States Patent
Ibrahim et al.

(10) Patent No.: US 7,301,993 B2
(45) Date of Patent: Nov. 27, 2007

(54) CHANNEL ESTIMATION IN A SPREAD SPECTRUM RECEIVER

(75) Inventors: Brima Ibrahim, Los Angeles, CA (US); Prasanna Desai, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 862 days.

(21) Appl. No.: 10/243,857

(22) Filed: Sep. 13, 2002

(65) Prior Publication Data

US 2004/0052306 A1    Mar. 18, 2004

(51) Int. Cl.
*H04B 1/00*    (2006.01)
(52) U.S. Cl. .................. 375/152; 375/143; 375/150; 375/142
(58) Field of Classification Search ........ 375/142–144, 375/147–148, 150, 152, 285, 346, 350; 370/252, 370/320, 335, 342, 465, 479; 455/63.1, 67.11, 455/67.13, 50.1, 52.1, 52.3, 296, 306, 307
See application file for complete search history.

(56) References Cited

U.S. PATENT DOCUMENTS

| | | | | |
|---|---|---|---|---|
| 5,353,307 | A * | 10/1994 | Lester et al. | 375/233 |
| 5,692,006 | A * | 11/1997 | Ross | 375/147 |
| 5,822,363 | A * | 10/1998 | Le Roy | 375/143 |
| 5,960,028 | A * | 9/1999 | Okamoto et al. | 375/130 |
| 6,888,812 | B1 * | 5/2005 | Iwasaki | 370/342 |
| 7,031,671 | B2 * | 4/2006 | Mottier | 455/101 |
| 2003/0078011 | A1 * | 4/2003 | Cheng et al. | 455/73 |
| 2005/0233710 | A1 * | 10/2005 | Lakkis et al. | 455/102 |

FOREIGN PATENT DOCUMENTS

| | | | |
|---|---|---|---|
| EP | 675606 A1 | * | 10/1995 |
| WO | WO 0051260 | * | 8/2000 |

OTHER PUBLICATIONS

Electronics Letters—Feb. 19, 1998, vol. 34 No. 4.

* cited by examiner

*Primary Examiner*—David C. Payne
*Assistant Examiner*—Linda Wong
(74) *Attorney, Agent, or Firm*—Garlick Harrison & Markison; Timothy W. Markison; Bruce E. Stuckman

(57) ABSTRACT

A method and apparatus for channel estimation in a spread spectrum receiver include processing that begins by despreading a received spread spectrum complex baseband sample utilizing a pseudorandom spreading sequence to produce a despread baseband symbol. The processing continues by filtering the despread baseband symbol to attenuate adverse channel effects based on a channel response estimate to produce a filtered despread baseband symbol. The processing then continues by decoding the filtered despread baseband symbol to produce recaptured data. The processing continues by modulating the recaptured data to produce a remodulated symbol. The processing then continues by producing a reconstructed spread spectrum complex baseband sample from the remodulated symbol based on the pseudorandom spreading sequence. The processing then continues by generating the channel response estimate such that a convolution of the channel response estimate with the reconstructed spread spectrum complex baseband sample substantially emulates the received spread spectrum complex baseband sample.

36 Claims, 8 Drawing Sheets digital receiver processing module 64 digital receiver processing module 64 matched filter module 100 channel matched filter 102 reconstruction module 104 channel response
determination module 106

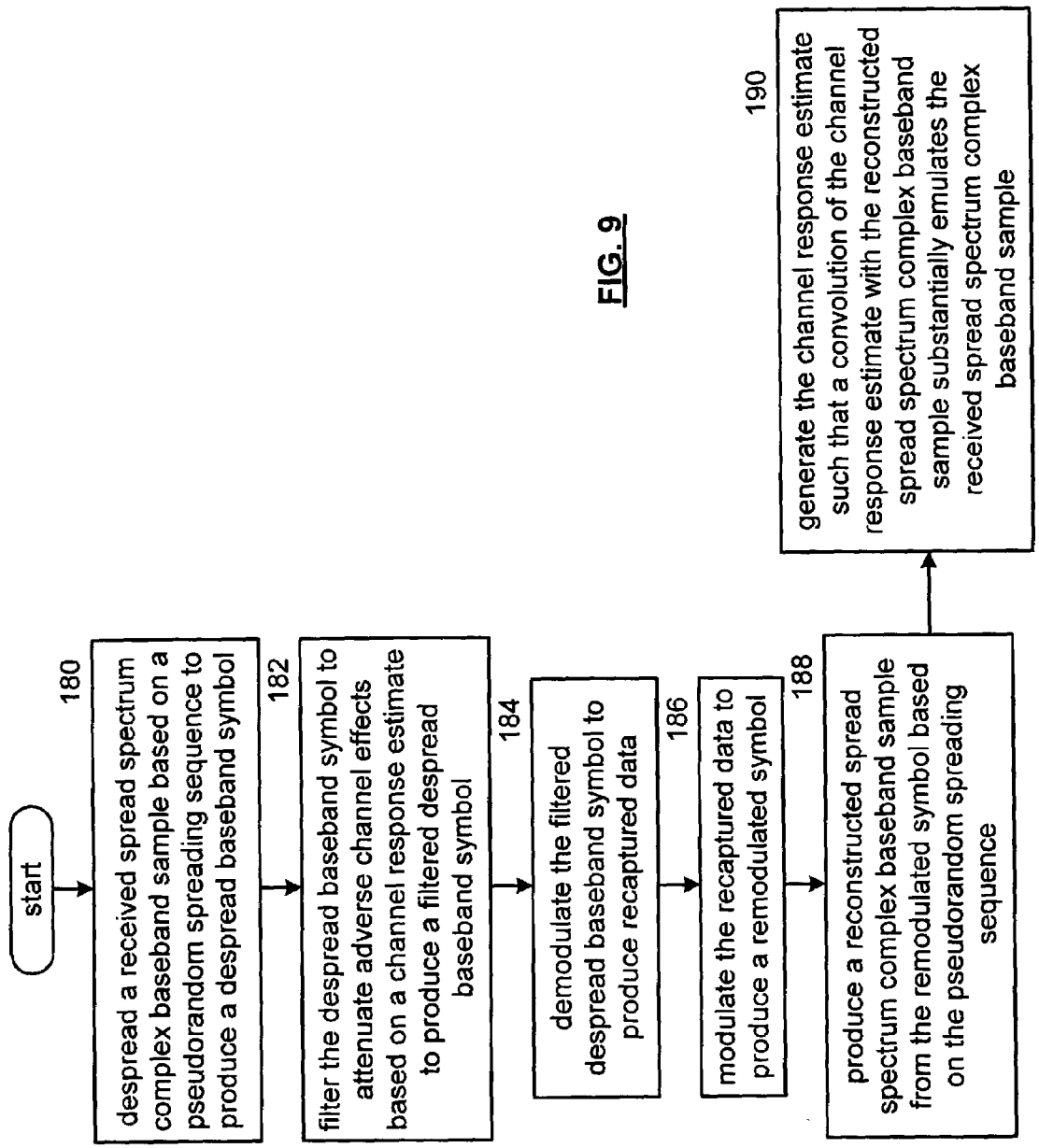

CHANNEL ESTIMATION IN A SPREAD SPECTRUM RECEIVER

TECHNICAL FIELD OF THE INVENTION

This invention relates generally to wireless communication systems and more particularly to spread spectrum receivers used within such wireless communication systems.

BACKGROUND OF THE INVENTION

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with the particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives an inbound RF signal via the antenna and amplifies it. The one or more intermediate frequency stages mix the amplified RF signal with one or more local oscillations to convert the amplified RF signal into a baseband signal or an intermediate frequency (IF) signal. The filtering stage filters the baseband signal or the IF signal to attenuate unwanted out of band signals to produce a filtered signal. The data recovery stage recovers raw data from the filtered signal in accordance with the particular wireless communication standard.

In an ideal wireless communication system, the RF signal received by the receiver exactly matches the RF signal transmitted by the transmitter. In practice, however, the RF signal received by the receiver has been distorted from the RF signal transmitted by the transmitter due to the frequency response of the channel carrying the RF signal, i.e., the channel response. For instance, multi-path effects, distance, transmit power levels, et cetera all effect the channel response and consequently, adversely affect the received RF signal.

To accurately recapture the data embedded in RF signals, a receiver includes a channel equalizer or channel match filter, which attempts to undo the adverse effects of the channel. To train the channel matched filter or the channel equalizer, a channel estimation function may be performed on known data contained in the RF signal. The recaptured data is evaluated with respect to the actual known data to determine the gain and frequency response of the channel, i.e., the channel response. From this evaluation, the channel estimation function is determined and is subsequently used to provide the channel equalization.

Needless to say, channel estimation is a complex and vital function for accurate wireless communications. Typically, channel estimation circuitry includes a multi-tap filter and a coefficient estimation circuitry, wherein the coefficient estimation circuitry determines the coefficients that shape the multi-tap filter based on the channel response. The channel estimation circuitry processes up to each tap of the multi-tap filter separately and at the chip rate (i.e., the rate of the direct sequence spread spectrum signal), which requires the processor(s) of the coefficient estimation circuitry to operate at very high rates. Even though the channel estimation circuitry is operating at very high rates, the processing takes multiple iterations to obtain the coefficients, which is time consuming and requires complex hardware. In some applications, there is not sufficient time to completely train the channel estimation circuitry even though it is operating at very high rates. For example, in an IEEE 802.11b application, the channel estimation circuitry uses the preamble of a packet to obtain the channel estimation. The preamble may include a long or short SYNC data unit. When the preamble includes the short SYNC data unit, which is 56 microseconds in length, current channel estimation circuitry cannot obtain a reliable channel estimation for an entire multipath channel in such a short time, so compromises are made. For instance, only the three most prominent paths of the multipath channel are used, which reduces the accuracy of channel equalization.

Therefore, a need exists for a faster, more accurate, and less complex channel estimation method and apparatus for use in wireless communication systems.

SUMMARY OF THE INVENTION

The channel estimation in a spread spectrum receiver of the present invention substantially meets these needs and others. In one embodiment, a channel estimation module for use in a spread spectrum receiver includes a matched filter module, channel matched filter, reconstruction module and channel response determination module. The matched filtered module is operably coupled to produce a despread baseband symbol and delayed spread spectrum complex baseband samples from received spread spectrum complex baseband samples. In one embodiment, the matched filter module may be implemented utilizing a Barker matched filter having finite impulse response (FIR) filter matched to an eleven bit Barker sequence. Due to the full length and partial length auto correlation properties of a Barker sequence, the despread baseband symbol may be accurately determined even though errors exist in the received spread spectrum complex baseband signal caused by the channel.

The channel matched filter is operably coupled to filter the despread baseband symbol to produce a filtered symbol. In essence, the channel matched filter, which may be a multi-tap FIR filter, is attempting to approximate the conjugate of the channel response of the RF signal received by the spread spectrum receiver. The channel matched filter is shaped in accordance with the complex conjugate estimated channel response, which is generated by the channel response determination module. Since the channel matched filter is filtering the despread baseband symbol as opposed to the received spread spectrum complex baseband signal, it is operating at the symbol rate as opposed to the chip rate, thus it requires less gates to implement and consumes less power than prior art channel matched filters.

The reconstruction module is operably coupled to receive the filtered symbol and to produce therefrom reconstructed spread spectrum complex baseband samples. In essence, the reconstruction module converts the filtered symbol into data and then remodulates the data in accordance with a particular wireless communication standard to produce a remodulated symbol. The reconstruction module then spreads the spectrum of the remodulated symbol using the same pseudorandom spreading sequence (e.g., Barker sequence) that was used by the transmitting device to produce the received spread spectrum complex baseband samples to produce the reconstructed spread spectrum complex baseband samples. The reconstructed spread spectrum complex baseband samples represent the ideal spread spectrum complex baseband samples for this particular symbol since it has not been adversely affected by the channel response.

The channel response determination module is operably coupled to generate the estimated channel response based on the delayed spread spectrum complex baseband samples, which have been adversely affected by the channel response, and the reconstructed spread spectrum complex baseband samples, which has not been adversely affected by the channel response. In one embodiment, the channel response determination module may use a least mean square algorithm based channel estimator that effectively generates an estimated channel response that essentially accounts for both the gain and phase profiles at various delays for the entire channel. The resulting estimated channel response includes coefficients that, when provided to the channel matched filter, enables the channel matched filter to maximize signal to noise ratio at its output, thus substantially mitigating the adverse effects caused by the channel response.

A method for channel estimation in a direct sequence spread spectrum receiver begins by despreading received spread spectrum complex baseband samples utilizing a pseudorandom spreading sequence (e.g., a Barker code) to produce a despread baseband symbol. The processing continues by filtering the despread baseband symbol to attenuate adverse channel effects based on a channel response estimate to produce a filtered despread baseband symbol.

The processing then continues by demodulating the filtered despread baseband symbol to produce recaptured data. The processing continues by modulating the recaptured data to produce a remodulated symbol. The processing then continues by producing reconstructed spread spectrum complex baseband samples from the remodulated symbol based on the pseudorandom spreading sequence. The processing then continues by generating the channel response estimate such that a convolution of the channel response estimate with the reconstructed spread spectrum complex baseband samples substantially emulates the received spread spectrum complex baseband samples.

BRIEF DESCRIPTION OF THE DRAWINGS

FIG. 9 is a logic diagram of a method for channel estimation in a spread spectrum receiver in accordance with the present invention.

DETAILED DESCRIPTION OF A PREFERRED EMBODIMENT

Figure 1:
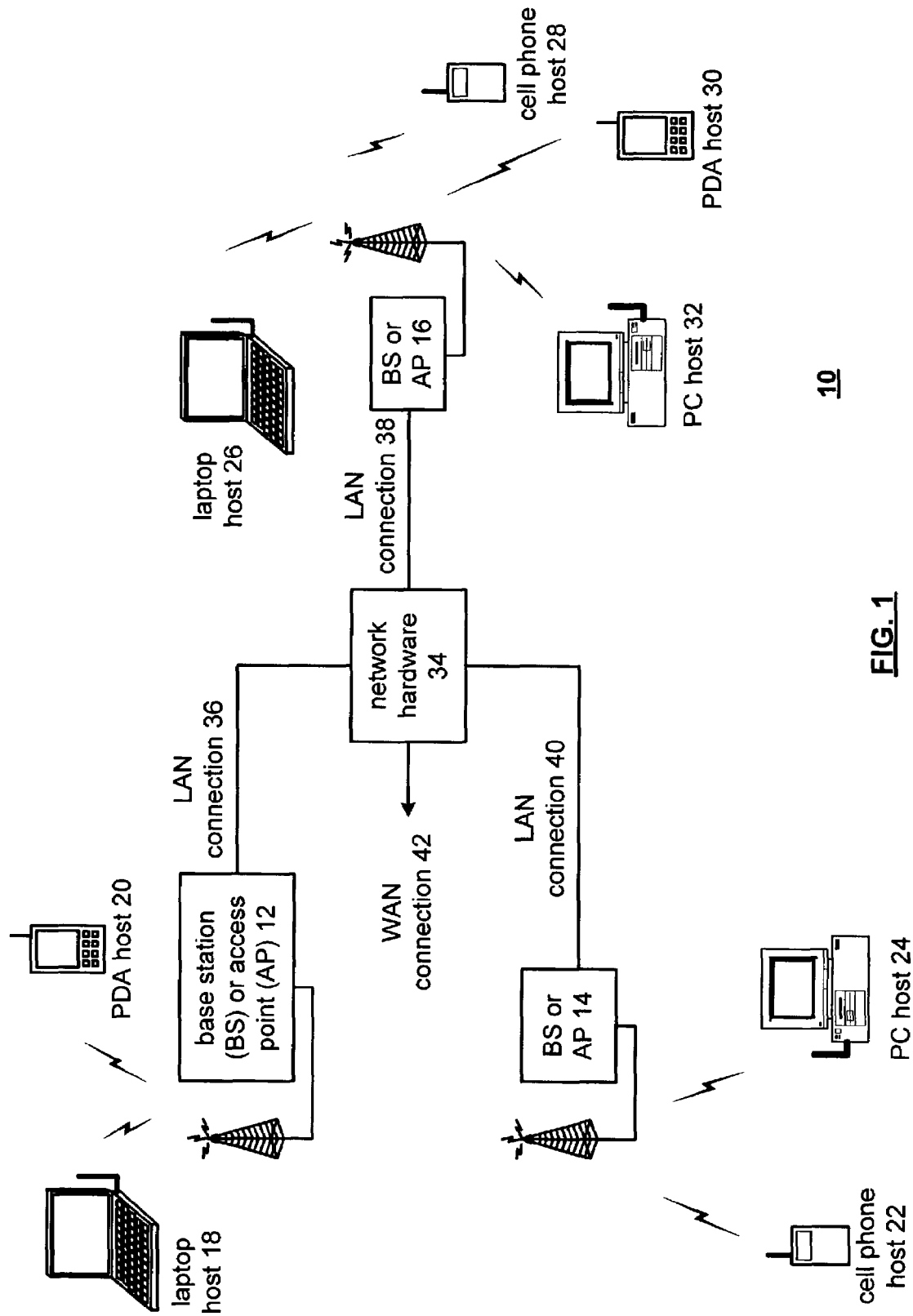
FIG. 1 is a schematic block diagram illustrating a wireless communication system in accordance with the present invention.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
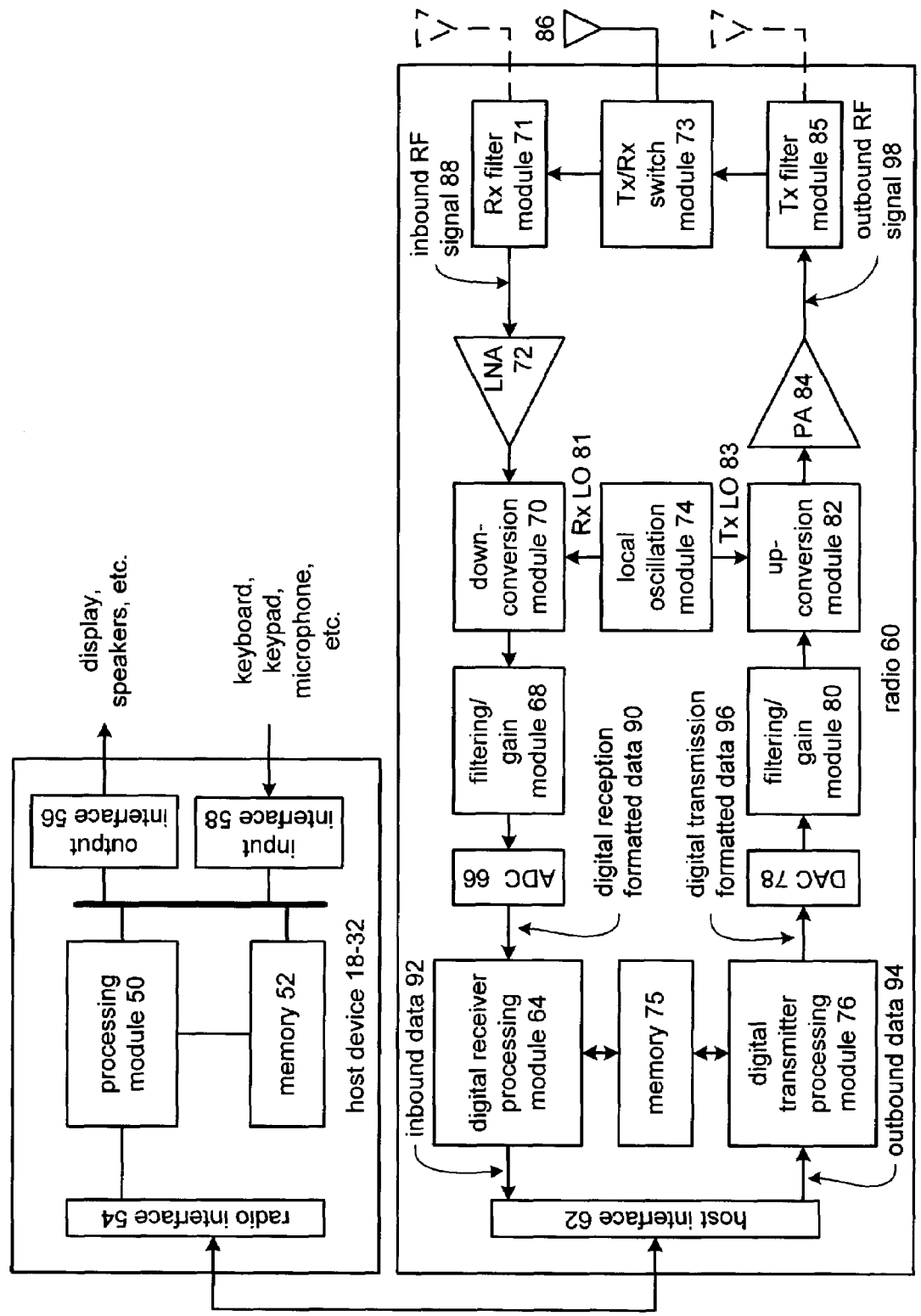
FIG. 2 is a schematic block diagram illustrating a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/gain module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, and an antenna 86. The antenna 86 may be a single antenna that is shared by the transmit and receive paths as regulated by the Tx/Rx switch 77, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, channel equalization, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 75 stores, and the processing module 64 and/or 76 executes, operational instructions corresponding to at least some of the functions illustrated in FIGS. 3-9.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE802.11a, IEEE802.11b, Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 directly converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch 77, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/gain module 68. The filtering/gain module 68 filters, attenuates and/or gains the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 performs channel equalization in accordance with the teachings of the present invention and then decodes, descrambles, demaps, and/or demodulates the channel equalized digital reception formatted data 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
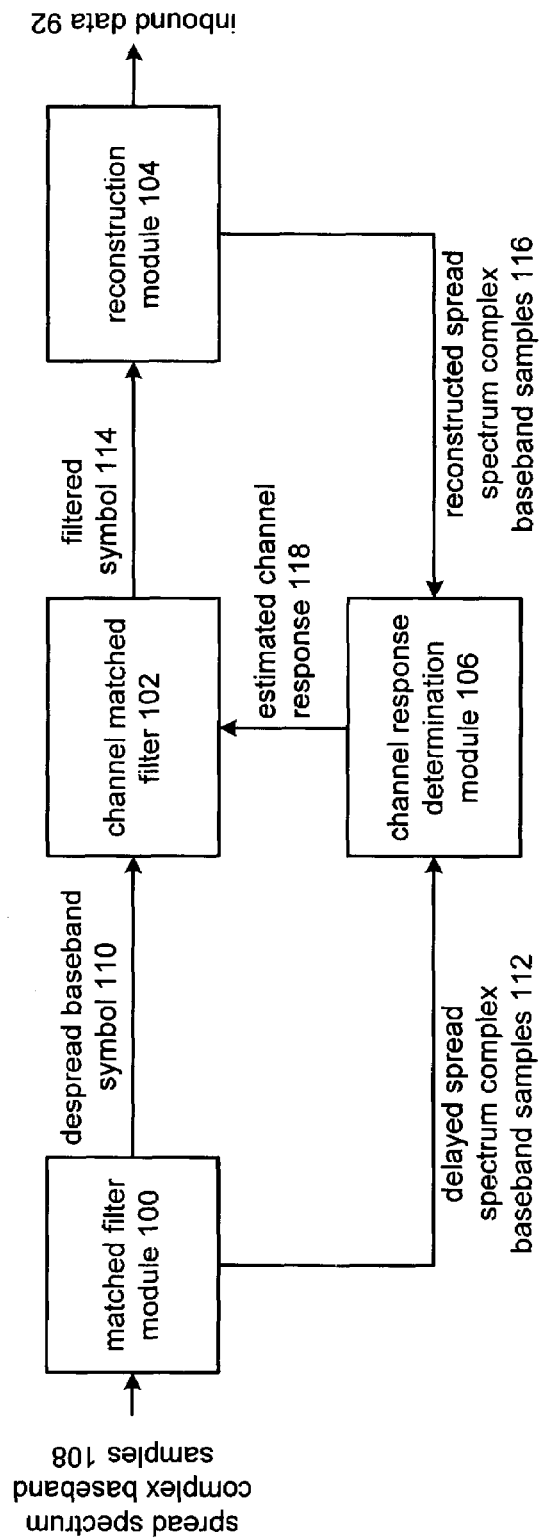
FIG. 3 is a schematic block diagram illustrating the digital receiver processing module in accordance with the present invention.

FIG. 3 is a schematic block diagram illustrating a channel estimation module that may be implemented in the digital receiver processing module 64. Alternatively, the channel estimation module may be implemented as a stand-alone device or as a plurality of discrete components. The channel estimation module includes a match filter module 100, channel matched filter 102, reconstruction module 104, and channel response determination module 106. The match filter module 100, which will be discussed in greater detail with reference to FIG. 5, receives the digital reception formatted data 90 as spread spectrum complex baseband samples 108. The spread spectrum complex baseband samples 108 may a single-ended or differential signal including an I component and a Q component that represents a symbol (i.e., encoded data based on the encoding/modulation/scrambling protocol of the particular wireless communication standard being implemented) and that has been spread using a pseudorandom spreading sequence. In one embodiment, the pseudorandom spreading sequence may be a Barker code that is an 11-bit pattern.

Figure 4:
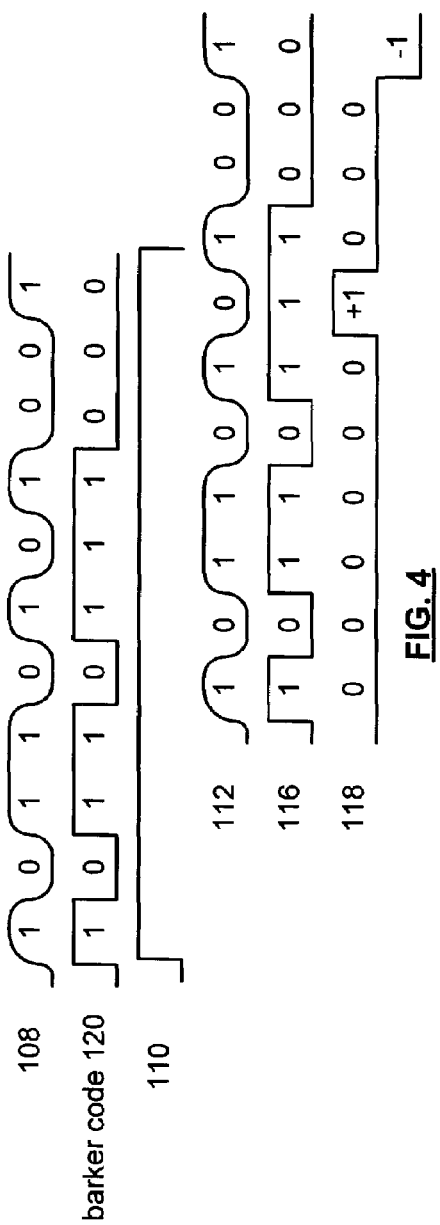
FIG. 4 is a timing diagram illustrating general operation of the digital receiver processing module of FIG. 3.

The match filter module 100 produces a despread baseband symbol 110 and delayed spread spectrum complex baseband samples 112 from the spread spectrum complex baseband sample 108. In one embodiment, the spread spectrum complex baseband sample includes an 11-bit pattern corresponding to a particular symbol that has been spread using the 11-bit Barker code. Due to the channel response of the channel, the spread spectrum complex baseband samples will most likely not match the ideal spread spectrum complex baseband samples for the given symbol. For example and with reference to FIG. 4, the spread spectrum complex baseband samples 108 are shown to have distortion (e.g., rounding of the chip transitions and may further include data errors) caused by the channel response. FIG. 4 further illustrates the 11-bit pattern of the Barker code 120, which is used by the matched filter module 100 to produce the despread baseband symbol 110 as shown. In this example, the spread spectrum complex baseband samples 108 include a bit pattern of 10110101001, which does not match the ideal pattern (e.g., 10110111000) of the Barker code due to the channel response of the channel. In this simplified example of FIG. 4, the difference between the ideal Barker code spread spectrum samples 120 and the actual spread spectrum complex baseband samples 108 represents the adverse effects caused the channel response of the channel, noise, and/or interference.

Referring back to FIG. 3, the channel matched filter 102, which will be described in greater detail with reference to FIG. 6, receives the despread baseband symbol 110 and, based on an estimated channel response 118, produces a filtered symbol 114. In general, the channel matched filter 102, based on the channel estimated response 118, is effectively approximating the channel response of the channel. For example, if the transfer function of the channel is determined to be $H(\omega)$, then the channel matched filter 102 is configured to provide a filter response of approximately $H^*(\omega)$, which maximizes the signal to noise ratio at its output. To ensure that the weaker paths of the multi-path on which the RF signal containing the spread spectrum complex baseband samples 108 was received that precede the dominant path of the multi-path are not lost, the channel matched filter 102 is centered at the dominant path of an initial snapshot of the channel impulse response.

As one of average skill in the art will appreciate, the filtered symbol 114 may be used in timing recovery and frequency recovery loops. As such, the timing recovery and frequency recovery loops may operate simultaneously with the channel estimation process. To allow the timing and frequency recovery loops to settle, a gear shifting method that enables the timing recovery and frequency recovery loops to dominate error correction by reducing the magnitude of corrections made by the channel estimation process. After fine frequency error removal, the channel estimation module may be enabled again and the quality of the channel estimate is enhanced since the frequency error is negligible.

The reconstruction module 104, which will be described in greater detail with reference to FIG. 7, demodulates and decodes the filtered symbol 114 in accordance with the particular wireless communication standard being implemented to produce the inbound data 92. In addition, the reconstruction module 104 remodulates and re-encodes the inbound data 92 in accordance with the particular wireless communication standard being implemented to produce remodulated data. The reconstruction module 104 then spreads the spectrum of the remodulated data in accordance with the pseudorandom spreading sequence to produce reconstructed spread spectrum complex baseband samples 116. Note that since the reconstructed spread spectrum complex baseband samples 116 are based on the filtered symbol 114, they do not contain errors injected by the channel. Thus, for example, if the pseudorandom spreading sequence is a Barker code, the reconstructed spread spectrum complex sample 116 will include a bit pattern of 10110111000 as illustrated in FIG. 4.

Returning to the discussion of FIG. 3, the channel response determination module 106, which will be described in greater detail with reference to FIG. 8, uses the delayed spread spectrum complex baseband samples 112 and the reconstructed spread spectrum complex baseband samples 116 to produce the estimated channel response 118. Since the reconstructed spread spectrum complex baseband samples 116 represent the uncorrupted spread spectrum samples of the symbol contained in the received spread spectrum complex baseband samples 108, the channel response determination module 106 generates the estimated channel response 118 such that when the channel estimated response 118 is convolved with the reconstructed spread spectrum complex baseband samples 116 the convolution emulates the delayed spread spectrum complex baseband samples 112. This is graphically illustrated in the simplified example of FIG. 4.

As shown in FIG. 4, the delayed spread spectrum complex baseband samples 112 corresponds to the received spread spectrum complex baseband samples 108, just shifted in time to account for processing delays in generating the reconstructed spread spectrum complex baseband samples 116. Thus, when the delayed spread spectrum complex baseband samples 112 and the reconstructed spread spectrum complex baseband samples 116 are coarsely aligned in time, a least mean square (LMS) algorithm is performed to minimize error between the reconstructed spread spectrum complex baseband samples 116 and the delayed spread spectrum complex baseband samples 112 by adjusting the coefficients of the channel response determination module 106.

As one of average skill in the art will appreciate, additional delay may be included in the path between the matched filter module 100 and the channel response determination module 106 and/or between the reconstruction module 104 and the channel response determination module 106 to adjust the timing such that the delayed spread spectrum complex baseband samples 112 align in time, at the chip rate, with the reconstructed spread spectrum complex baseband samples 116.

Figure 5:
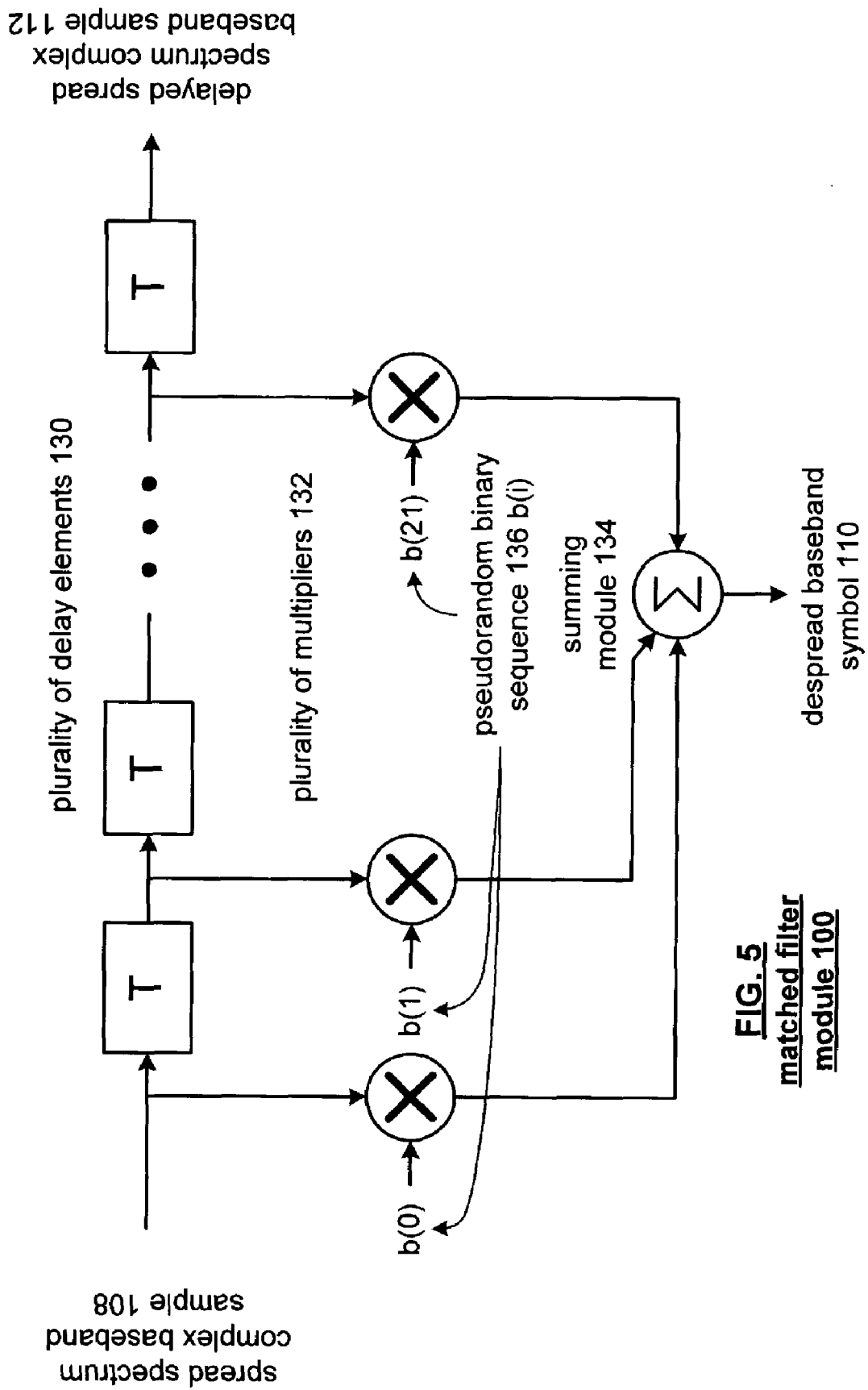
FIG. 5 is a schematic block diagram illustrating a matched filter module that may be used in the digital receiver processing module of FIG. 3.

FIG. 5 is a schematic block diagram illustrating an embodiment of the match filter module 100. The match filter module 100 includes a plurality of delay elements 130, a plurality of multipliers 132, and a summing module 134. The plurality of delay elements 130 is operably coupled to receive the spread spectrum complex baseband samples 108 and produce therefrom delayed spread spectrum complex baseband samples 112. In addition, each input to the plurality of delay elements 130 is provided to a corresponding one of the plurality of multipliers 132.

Each of the plurality of multipliers 132 multiplies a pseudorandom binary sequence b(i) 136 with the corresponding samples from the delay elements. The output of each of the multipliers 132 is summed via summing module 134 to produce the despread baseband symbol 110.

In a particular embodiment of the matched filter module 100, the matched filter module 100 is implemented as a Barker match filter that includes a 22-tap FIR (finite impulse response) filter, which has an impulse response corresponding to the 11-chip Barker code with zero insertion used to up-sample by a factor of 2 (e.g., from 11 MHz to 22 MHz). The Barker matched filter convolves a locally generated Barker code with the incoming spread spectrum complex baseband samples 108. In general, the Barker matched filter performs the equation of $$q(k) = \sum_{i=0}^{21} (p(k-i)b_i * (k)),$$

where, for the $k^{th}$ information symbol, p(k) is the input and q(k) is the output of the Barker matched filter and $b^{i*}(k)$ =$b_1(k)$ is the $i^{th}$ Barker bit, sampled at 22 MHz.

When the radio is used in a wireless local area network environment, the stations are typically located within 100 meters to 300 meters from an access point. As such, initial time and frequency errors result due to uncompensated local oscillation error, range uncertainty between the transmitter and receiver, and/or motion in the multiple path channel. The Barker matched filter outputs are used to reduce the time and frequency errors to within acceptable limits. When the two signals are in coarse alignment (less than 1 chip), the output will be high enough to exceed a threshold, indicating successful initial acquisition. Since carrier tracking is performed after acquisition, phase uncertainty exists during the signal detection phase. As a result, the energy detection method, which is not phase dependent, is used at the output to detect signal presence. The 11-chip Barker sequence used has full length and partial length auto correlation properties making it suitable for synchronization. The output of the Barker match filter is also used to perform coarse frequency error compensation. Under typical channel conditions and signal-to-noise ratios, the Barker match filter is able to perform the task of signal detection and coarse time and frequency acquisition within approximately 10-bits (e.g., within approximately 10 microseconds). For a short preamble, this leaves approximately 40 microseconds for purposes of channel estimation and fine time and frequency error correction, which is an improvement over prior art acquisition techniques.

Figure 6:
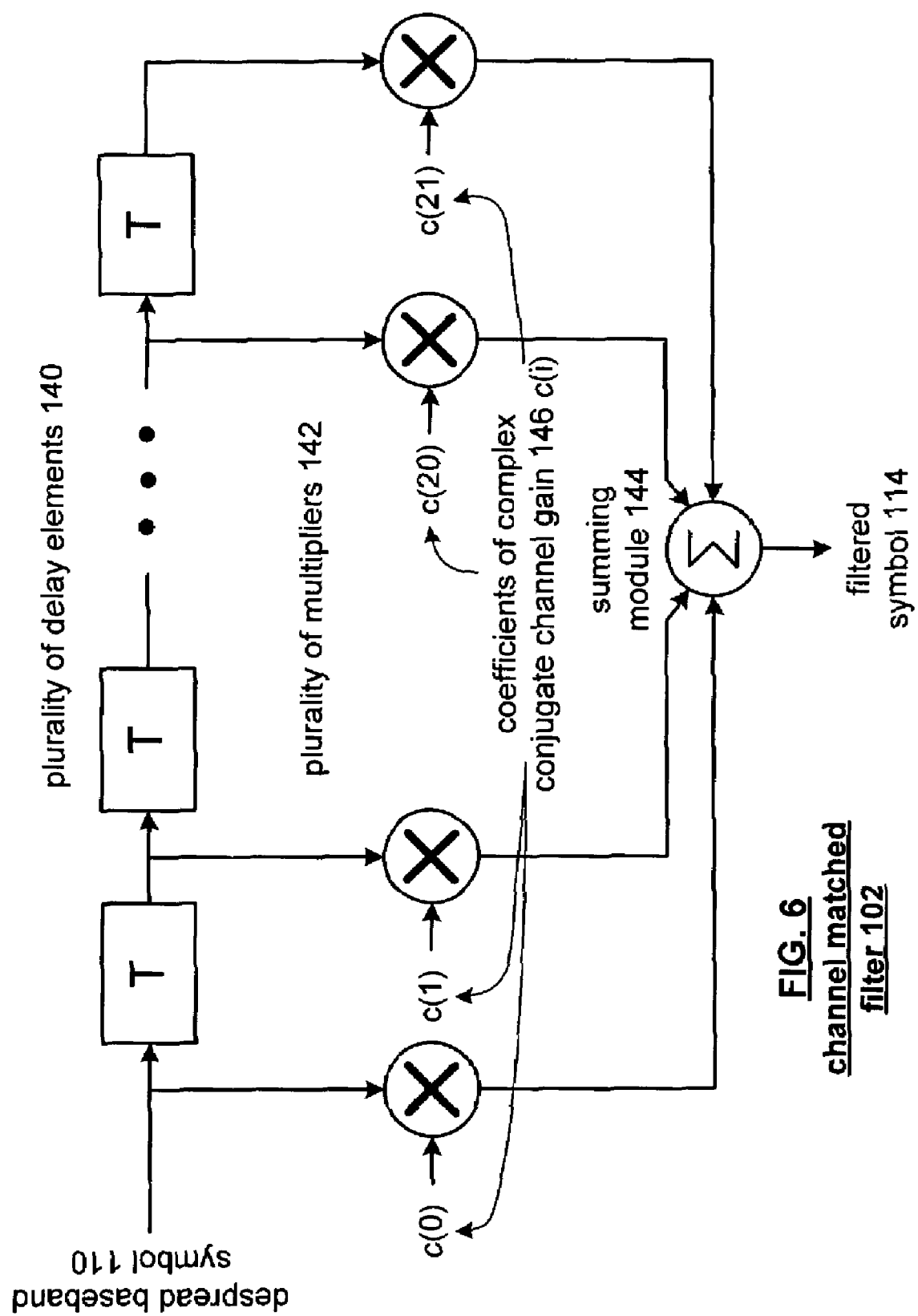
FIG. 6 is a schematic block diagram illustrating a channel matched filter that may be used in the digital receiver processing module of FIG. 3.

FIG. 6 is a schematic block diagram illustrating an embodiment of a channel matched filter 102. The channel matched filter 102 includes a plurality of delay elements 140, a plurality of multipliers 142 and a summing module 144. The plurality of delay elements 140 receives the despread baseband symbol 110 and provides successive delayed representations thereof.

The plurality of multipliers 142 multiplies coefficients of a complex conjugate channel gain c(i) 146, which represents the estimated channel response 118, with the corresponding delayed representations of the despread baseband symbol 110. The summing module 144 sums the outputs of each of the multipliers 142 to produce the filtered symbol 114.

In a particular embodiment of the channel matched filter 102, it is constructed as a RAKE combiner finite impulse response filter to produce the filtered symbol 114. In general, the RAKE combining FIR filter performs the equation of $$y(k) = \sum_{i=0}^{21} (x(k-i)c_i * (k)),$$

where, for the $k^{th}$ information symbol, x(k) is the input and y(k) is the output of the RAKE combiner and $c_i^*(k)$ is the complex conjugate of the channel response of the $i^{th}$ tap. Note that, since a multi-path channel can be modeled as a tapped delay line having an impulse response that approximates the multi-path intensity profile of a channel, the RAKE combining FIR filter is implemented as a matched filter corresponding to the transmitted signal that is corrupted by the multi-path channel and, as such, maximizes the signal-to-noise ratio at its output. By multiplying the despread baseband symbol 110 with the complex conjugate of the channel estimate, the phase shift of the channel is compensated and each path is weighted by a factor that is proportional to its signal strength.

To account for some weaker signal paths that may arrive prior to the dominant path, and in general to accommodate for some timing error in the priming of the channel matched filter taps during an initial warm-up period, the dominant path is centered at the $12^{th}$ tap of the channel matched filter 102. This accommodates delay spreading of up to + or −500 nanoseconds, which provides sufficient range for detecting the majority of the significant multiple paths of the channel.

As one of average skill in the art will appreciate, because of the aperiodic correlation properties of the 11-chip Barker code, the output of the Barker match filter represents a coarse snapshot of the channel impulse response, which may be used as initial coefficients for the channel match filter until the channel estimated coefficients are available from the channel response determination module 106. As one of average skill in the art will further appreciate, the outputs of the channel match filter 102 may be used for fine time tracking and frequency tracking.

Figure 7:
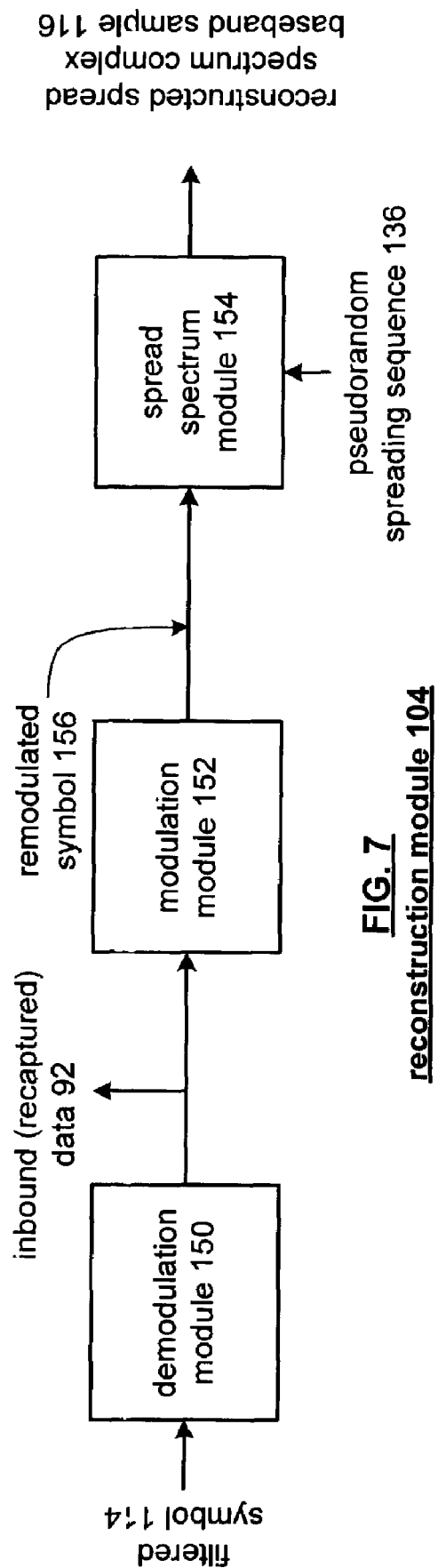
FIG. 7 is a schematic block diagram illustrating a reconstruction module that may be used in the digital receiver processing module of FIG. 3.

FIG. 7 is a schematic block diagram illustrating the reconstruction module 104. The reconstruction module 104 includes a demodulation module 150, a modulation module 152 and a spread spectrum module 154. The demodulation module 150 is operably coupled to receive the filtered symbol 114 and produce therefrom inbound (recaptured) data 92. The demodulation module 150 may be a differential binary phase shift keying demodulator and/or differential quadrature phase shift keying demodulator. Initially, during the first few received bit periods of a preamble, the demodulator operates in a non-coherent manner (i.e., the phase in unknown) to produce the inbound data 92. Once the channel estimation is obtained, the demodulation module 150 may be switched to a coherent demodulator, which provides about 2 dB improvement in signal-to-noise ratio performance over a non-coherent demodulator. The improved performance of differentially coherent demodulation over non-coherent demodulation results in fewer bit errors being feedback to the channel estimator. Thus, resulting in fewer frame errors. Note that the switching from non-coherent demodulation to coherent demodulation should occur at a point to ensure that a consistent phase for the reference symbol is obtained.

The modulation module 152, which performs the inverse of the demodulation module 150 remodulates the inbound data 92 to produce a remodulated symbol 156. The spread spectrum module 154, based on a pseudorandom spreading sequence 136, spreads the demodulated symbol 156 to produce the reconstructed spread spectrum complex baseband samples 116. For example, the pseudorandom spreading sequence 136 may be the Barker code such that the reconstructed spread spectrum baseband samples 116 emulates the received spread spectrum complex baseband samples 108.

In an alternate embodiment of the reconstruction module, a descrambler/scrambler configuration may be used to generate the preamble at the receiver to be used as a reference at the LMS-based channel response determination module 106. With a self-synchronizing descrambler, after synchronization is achieved, the scrambler can be seeded using the state in the descrambler and the remainder of the preamble may be generated in this manner without the need to rely on decision-directed feedback.

Figure 8:
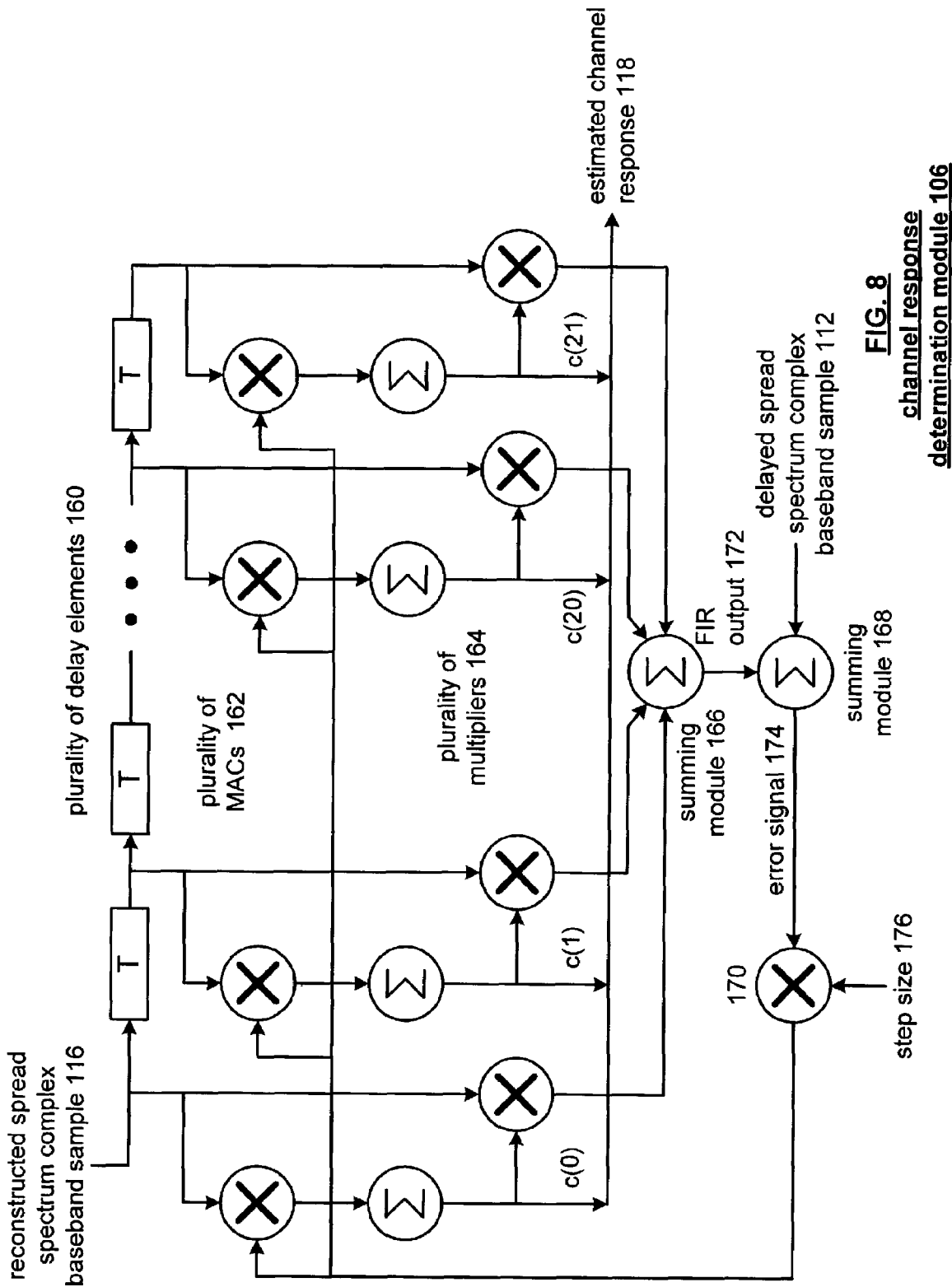
FIG. 8 is a schematic block diagram illustrating a channel response determination module that may be used in the digital receiver processing module of FIG. 3.

FIG. 8 is a schematic block diagram illustrating an embodiment of the channel response determination module 106. The channel response determination module 106 includes a plurality of delay elements 160, a plurality of multiply accumulators (MAC) 162, a plurality of multipliers 164, a $1^{st}$ summing module 166, a $2^{nd}$ summing module 168 and a multiplier 170. The plurality of delay elements 160 are operably coupled to receive the reconstructed spread spectrum complex baseband samples 116 and to produce a series of delayed representations thereof.

The plurality of multiply accumulators 162 are operably coupled to produce corresponding coefficients of the estimated channel response 118 based on a corresponding delayed representation of the reconstructed spread spectrum complex baseband samples 116 and an error signal 174. The error signal 174 is the difference between the finite impulse response (FIR) output 172 and the delayed spread spectrum complex baseband samples 112. The error signal 174 may be scaled via multiplier 170 and a corresponding step size 176. In general, after the initial channel estimation has been obtained, the error signal 174 will be scaled such that the timing and phase-frequency recovery loops will dominate the correction of their respective error signals. The summing module 166 produces the FIR output 172 by summing the outputs of the plurality of multipliers 164.

In a particular embodiment, the channel response determination module may be implemented as a least mean square (LMS) based channel estimator utilizing the finite impulse response filtering. In general, the channel response determination module utilizes an LMS algorithm to produce the FIR output 172. In this particular embodiment, the channel response determination module includes 32 taps in length, which may be truncated to 22 taps for the coefficients of the estimated channel response. The truncation may be done by disregarding the 10 taps farthest away from the dominate path. Note that the channel estimation filter may employ additional coefficient pruning by setting the weights of extremely weak signal paths to zero in order to prevent a noise enhancement effect that might be seen at low signal-to-noise ratios.

The channel response determination module converges rapidly to produce the FIR output 172. This enables the step size 176 to be selected to have a coarse granularity initially, but a smaller step size after convergence to allow fine tuning of the channel estimate. Therefore, a gear shifting technique is employed whereby the step size is initially large to achieve fast initial convergence but is reduced when the channel estimation is used to track slow time variations in the channel. Note that after initial acquisition, the channel estimation module may be locked to the determined tap settings or may be used during channel tracking, where the LMS algorithm may be clocked at a sub-multiple of 22 MHz (since less frequent LMS updates are required) to reduce power consumption. Further note that the channel response determination module is 32 taps long where the $12^{th}$ tap is selected to correspond to the dominant path. This allows resolvable path energies within a (−500 nanoseconds, +1000 nanosecond) window around the $12^{th}$ tap to be estimated.

An implementation of the channel response determination module 106 may be simplified in hardware by eliminating the multiplier operations or clocking registers at lower speeds by taking advantage of the delay line elements using binary values that have alternating samples of zero values. In addition, the step size multiplication may be achieved by a simple bit shift operation as opposed to a multiplication. Further, banked polyphase implementation allows further reduction of delay line lengths from 32 registers to 16 registers and a reduction in the clocking from 22 MHz to 11 MHz.

As one of average skill in the art will appreciate, the residual mean square error of the LMS algorithm of the channel response determination module 106 may be used to assign qualities to demodulated symbols and also to provide an estimate of noise variance that is used for computation of the decision feedback equalizer coefficients at start up of the high-rate complementary code keying receiver, which may be done in accordance with IEEE 802.11b.

FIG. 9 is a flow chart of a method for channel estimation is a spread spectrum receiver. The process begins at Step 180 where received spread spectrum complex baseband samples are despread based on a pseudo random spreading sequence to produce a despread baseband symbol. The despreading may be done by performing a matched spread spectrum filtering, which in itself includes delaying the received spread spectrum complex baseband symbol to produce delayed spread spectrum complex baseband samples. The delayed spread spectrum complex baseband samples are then multiplied by a pseudo random binary sequence to produce a plurality of despreading symbol components. The plurality of despreading symbol components is summed to produce the despread baseband symbol.

The process then proceeds to Step 182 where the despread baseband symbol is filtered to attenuate adverse channel effects based on a channel response estimate to produce a filtered despread baseband symbol. The filtering may be done in accordance with a RAKE combining finite impulse response filter function that multiplies the despread filtered symbol by a complex conjugate of channel response, which corresponds to the channel response estimate, such that the phase shift of the channel is compensated and the multiple paths of the channel are proportionally weighted based on corresponding signal strengths. In particular, the filtering may be done by delaying the despread baseband symbol to produce a series of delayed despread baseband symbols. The series of delayed despread baseband symbols are then multiplied with a plurality of coefficients representing the complex conjugate of the channel response to produce a plurality of filtered symbol components. The plurality of filtered symbol components are then summed to produce the filtered despread baseband symbol.

The process then proceeds to Step 184 where the filtered despread baseband symbol is demodulated in accordance with a particular wireless communication standard to produce recaptured data. The process then proceeds to Step 186 where the recaptured data is remodulated to produce a remodulated symbol. The modulation technique is in accordance with the particular wireless communication standard being implemented. The process then proceeds to Step 188 where reconstructed spread spectrum complex baseband samples are produced from the remodulated symbol based on the pseudo random spreading sequence.

The process then proceeds to Step 190 where the channel response estimated is generated such that a convolution of the channel response estimate with the reconstructed spread spectrum complex baseband samples substantially emulates the received spread spectrum complex baseband samples. This was discussed with reference to FIG. 8.

The preceding discussion has presented a method and apparatus for channel estimation that reduces complexity of the circuitry needed to produce the channel estimation while enhancing the speed and accuracy of channel estimation. As one of average skill in the art will appreciate, other embodiments may be derived from the teaching of the present invention, without deviating from the scope of the claims.

What is claimed is:

1. A channel estimation module for use in a spread spectrum receiver, the channel estimation module comprises:
    matched further module operably coupled to produce a despread baseband symbol and delayed spread spectrum complex baseband samples from received spread spectrum complex baseband samples;
    channel matched filter operably coupled to filter the despread baseband symbol based on an estimated channel response to produce an filtered symbol;
    reconstruction module operably coupled to receive the filtered symbol and to produce therefrom reconstructed spread spectrum complex baseband samples, the reconstruction module including a demodulation module operably coupled to demodulate the filtered symbol to produce recaptured data, a modulation module operably coupled to modulate the recaptured data to produce a remodulated symbol, and a spread spectrum module operably coupled to spread the remodulated symbol based on a pseudorandom spreading sequence to produce the reconstructed spread spectrum complex baseband samples; and
    channel response determination module operably coupled to generate the estimated channel response based on differences between the delayed spread spectrum complex baseband samples and the reconstructed spread spectrum complex baseband samples.

2. The channel estimation module of claim 1, wherein the matched filter module further comprises:
    finite impulse response filter module operably coupled to perform matched spread spectrum filtering on the received spread spectrum complex baseband samples to produce the despread baseband symbol.

3. The channel estimation module of claim 2, wherein the matched filter module further comprises:
    plurality of delay elements operably coupled to produce the delayed spread spectrum complex baseband signal by delaying the received spread spectrum complex baseband symbol;
    plurality of multipliers operably coupled to the plurality of delay elements, wherein the plurality of multipliers multiple a pseudorandom binary sequence with corresponding outputs of the plurality of delay elements to produce a plurality of despreading symbol components; and
    summing module operably coupled to sum the plurality of despreading symbol components to produce the despread baseband symbol.

4. The channel estimation module of claim 3, wherein the pseudorandom binary sequence further comprises:
    a Barker code sequence.

5. The channel estimation module of claim 1, wherein the channel marched filter further comprises:
    RAKE combining finite impulse response filter module operably coupled to multiply the despread filtered symbol by a complex conjugate of channel gain that corresponds to the estimated channel response such that phase shift of a channel carrying the received spread spectrum baseband samples are compensated and multiple paths of the channel are proportionally weighted based on corresponding signal strengths.

6. The channel estimation module of claim 5, wherein the channel marched filter further comprises:
    plurality of delay elements operably coupled to produce a series of delayed despread baseband symbols by delaying the despread baseband symbol;
    plurality of multipliers operably coupled to the plurality of delay elements, wherein the plurality of multipliers multiply the series of delayed despread baseband symbols with a plurality of coefficients representing the complex conjugate of the channel gain to produce a plurality of filtered symbol components; and
    summing module operably coupled to sum the plurality of filtered symbols to produce the filtered symbol.

7. The channel estimation module of claim 1, wherein the channel response determination module further comprises:
   finite impulse response filter module operably coupled to perform a least mean square (LMS) algorithm on the reconstructed spread spectrum complex baseband samples in accordance with converging channel coefficients to produce to a finite impulse response (FIR) output;
   summing module operably coupled to sum the FIR output with the delayed spread spectrum complex baseband samples to produce an error signal; and
   channel coefficient converging module operably coupled to produce the converging channel coefficients based on the error signal.

8. The channel estimation module of claim 7, wherein the FIR filter module further comprises:
   plurality of delay elements operably coupled to delay the reconstructed spread spectrum complex baseband samples to produce delayed reconstructed spread spectrum complex baseband samples;
   plurality of multiplying modules operably coupled to the plurality of delay elements, wherein the plurality of multiplying modules multiple the converging channel coefficients with the delayed reconstructed spread spectrum complex baseband samples to produce a plurality of FIR output components; and
   summing module operably coupled to sum the plurality of FIR output components to produce the FIR output.

9. The channel estimation module of claim 8, wherein the channel coefficient converging module further comprises:
   plurality of multiply-accumulate modules operably coupled the plurality of delay elements, wherein the each of the multiply-accumulate modules multiplies a corresponding one of the delayed reconstructed spread spectrum complex baseband samples with the error signal to produce a current resultant and accumulates the current resultant with at least one previous resultant to produce a corresponding one of the converging channel coefficients.

10. The channel estimation module of claim 9, wherein the channel coefficient converging module further comprises:
    step size module operably coupled to adjust step size of the error signal.

11. A method for channel estimation in a spread spectrum receiver, the method comprises:
    despreading received spread spectrum complex baseband samples based on a pseudorandom spreading sequence to produce a despread baseband symbol;
    filtering the despread baseband symbol to attenuate adverse channel effects based on a channel response estimate to produce a filtered despread baseband symbol;
    demodulating the filtered despread baseband symbol to produce recaptured data;
    modulating the recaptured data to produce a remodulated symbol;
    producing reconstructed spread spectrum complex baseband samples from the remodulated symbol based on the pseudorandom spreading sequence; and
    generating The channel response estimate by performing a least mean square (LMS) algorithm on the reconstructed spread spectrum complex baseband samples in accordance with converging channel coefficients to produce to an finite impulse response (FIR) output, delaying the received spread spectrum complex baseband samples to produce delayed spread spectrum complex baseband samples, summing the FIR output with the delayed spread spectrum complex baseband samples to produce an error signal, and producing the converging channel coefficients based on the error signal, such that a convolution of the channel response estimate with the reconstructed spread spectrum complex baseband samples substantially emulates the received spread spectrum complex baseband samples.

12. The method of claim 11, wherein the despreading the received spread spectrum complex baseband signal further comprises:
    performing matched spread spectrum filtering on the received spread spectrum complex baseband samples to produce The despread baseband symbol.

13. The method of claim 12, wherein the performing The matched spread spectrum filtering further comprises:
    delaying The received spread spectrum complex baseband samples to produce delayed spread spectrum complex baseband samples;
    multiplying a pseudorandom binary sequence with the delayed spread spectrum complex baseband samples to produce a plurality of despreading symbol components; and
    summing the plurality of despreading symbol components to produce the despread baseband symbol.

14. The method of claim 11, wherein the filtering of the despread baseband symbol further comprises:
    multiplying, in accordance with a RAKE combining finite impulse response filter function, the despread filtered symbol by a complex conjugate of channel gain that corresponds to the channel response estimate such that phase shift of a channel carrying the received spread spectrum baseband samples are compensated and multiple parts of the channel are proportionally weighted based on corresponding signal strengths.

15. The method of claim 14, wherein the filtering of the despread baseband symbol further comprises:
    delaying the despread baseband symbol to produce a series of delayed despread baseband symbols;
    multiplying the series of delayed despread baseband symbols with a plurality of coefficients representing the complex conjugate of the channel gain to produce a plurality of filtered symbol components; and
    summing the plurality of filtered symbol components to produce the filtered despread baseband symbol.

16. The method of claim 11, wherein the performing the FIR algorithm further comprises:
    delaying the reconstructed spread spectrum complex baseband samples to produce delayed reconstructed spread spectrum complex baseband samples;
    multiplying the converging channel coefficients with the delayed reconstructed spread spectrum complex baseband samples to produce a plurality of FIR output components; and
    summing the plurality of FIR output components to produce the FIR output.

17. The method of claim 16, wherein the performing the LMS algorithm further comprises:
    multiplying a corresponding one of the delayed reconstructed spread spectrum complex baseband samples with the error signal to produce a current resultant; and
    accumulating the current resultant with at least one previous resultant to produce a corresponding one of the converging channel coefficients.

18. The method of claim 17 further comprises:
    adjusting step size of the error signal.

19. A spread spectrum receiver comprises:
processing module; and
memory operably coupled to the processing module, wherein the memory includes operational instructions that cause the processing module to:
despread received spread spectrum complex baseband samples based on a pseudorandom spreading sequence to produce a despread baseband symbol;
filter the despread baseband symbol to attenuate adverse channel effects based on a channel response estimate to produce a filtered despread baseband symbol;
demodulate the filtered despread baseband symbol to produce recaptured data;
modulate the recaptured data to produce a remodulated symbol;
produce reconstructed spread spectrum complex baseband samples from the remodulated symbol based on the pseudorandom spreading sequence; and
generate the channel response estimate by performing a least mean square (LMS) algorithm on the reconstructed spread spectrum complex baseband sample in accordance with converging channel coefficients to produce to a finite impulse response (FIR) output, summing the FIR output with the delayed spread spectrum complex baseband samples to produce an error signal, and producing the converging channel coefficients based on the error signal, such that a convolution of the channel response estimate with the reconstructed spread spectrum complex baseband samples substantially emulate the despread baseband symbol.

20. The spread spectrum receiver of claim 19, wherein the memory further comprises operational instructions that cause the processing module to despread the received spread spectrum complex baseband signal by:
performing matched spread spectrum filtering on the received spread spectrum complex baseband samples to produce the despread baseband symbol.

21. The spread spectrum receiver of claim 20, wherein the memory further comprises operational instructions that cause the processing module to perform the marched spread spectrum filtering by:
delaying the received spread spectrum complex baseband samples to produce delayed spread spectrum complex baseband samples;
multiplying a pseudorandom binary sequence with the delayed spread spectrum complex baseband samples to produce a plurality of despreading symbol components; and
summing the plurality of despreading symbol components to produce the despread baseband symbol.

22. The spread spectrum receiver of claim 19, wherein the memory further comprises operational instructions that cause the processing module to filter the despread baseband symbol by:
multiplying, in accordance with a RAKE combining finite impulse response filter function, the despread filtered symbol by a complex conjugate of channel gain that corresponds to the channel response estimate such that phase shift of a channel carrying the received spread spectrum baseband samples are compensated and multiple paths of the channel are proportionally weighted based on corresponding signal strengths.

23. The spread spectrum receiver of claim 22, wherein the memory further comprises operational instructions that cause the processing module to filter the despread baseband symbol by:
delaying the despread baseband symbol to produce a series of delayed despread baseband symbols;
multiplying the series of delayed despread baseband symbols with a plurality of coefficients representing the complex conjugate of the channel gain to produce a plurality of filtered symbol components; and
summing the plurality of filtered symbol components to produce the filtered despread baseband symbol.

24. The spread spectrum receiver of claim 19, wherein the memory further comprises operational instructions that cause the processing module to perform the LMS algorithm by:
delaying the reconstructed spread spectrum complex baseband samples to produce delayed reconstructed spread spectrum complex baseband samples;
multiplying the converging channel coefficients with the delayed reconstructed spread spectrum complex baseband samples to produce a plurality of FIR output components; and
summing the plurality of FIR output components to produce the FIR output.

25. The spread spectrum receiver of claim 24, wherein the memory further comprises operational instructions that cause the processing module to perform the LMS algorithm by:
multiplying a corresponding one of the delayed reconstructed spread spectrum complex baseband samples with the error signal to produce a current resultant; and
accumulating the current resultant with at least one previous resultant to produce a corresponding one of the converging channel coefficients.

26. The spread spectrum receiver of claim 25, wherein the memory further comprises operational instructions that cause the processing module to:
adjust step size of the error signal.

27. A spread spectrum radio comprises:
transmitter section operably coupled to convert outbound data into an outbound radio frequency (RF) signal;
receiver section operably coupled to convert an inbound RF signal into inbound data, wherein the receiver section includes:
down conversion module operably coupled to convert the inbound RF signal into inbound baseband signal;
gain control module operably coupled to increase amplitude of the inbound baseband signal to produce a gained inbound baseband signal;
analog to digital converter operably coupled to convert the gained inbound baseband signal into a digital baseband signal;
channel select filter module operably coupled to filter the digital baseband signal to produce at least one spread spectrum complex baseband sample;
matched filter module operably coupled to produce a despread baseband symbol and a delayed spread spectrum complex baseband sample from a spread spectrum complex baseband sample of the at least one spread spectrum complex baseband sample;
channel matched filter operably coupled to filter the despread baseband symbol based on an estimated channel response to produce an filtered symbol;
reconstruction module operably coupled to receive the filtered symbol and to produce therefrom a reconstructed spread spectrum complex baseband sample and the inbound data, the reconstruction module including a demodulation module operably coupled to demodulate the filtered symbol to produce the inbound data, a modulation modulate operably coupled to modulate the inbound data to produce a remodulated symbol, and a spread spectrum module operably coupled to spread the remodulated symbol based on a pseudorandom spreading sequence to produce the reconstructed spread spectrum complex baseband sample; and channel response determination module operably coupled to generate the estimated channel response based on differences between the delayed spread spectrum complex baseband sample and the reconstructed spread spectrum complex baseband sample.

28. The spread spectrum radio of claim 27, wherein the marched filter module further comprises:
finite impulse response filter module operably coupled to perform matched spread spectrum filtering on the spread spectrum complex baseband sample to produce the despread baseband symbol.

29. The spread spectrum radio of claim 28, wherein the marched filter module further comprises:
plurality of delay elements operably coupled to produce the delayed spread spectrum complex baseband signal by delaying the spread spectrum complex baseband symbol;
plurality of multipliers operably coupled to the plurality of delay elements, wherein the plurality of multipliers multiple a pseudorandom binary sequence with corresponding outputs of the plurality of delay elements to produce a plurality of despreading symbol components; and
summing module operably coupled to sum the plurality of despreading symbol components to produce the despread baseband symbol.

30. The spread spectrum radio of claim 29, wherein the pseudorandom binary sequence further comprises:
a Barker code sequence.

31. The spread spectrum radio of claim 27, wherein the channel matched filter further comprises:
RAKE combining finite impulse response filter module operably coupled to multiply the despread filtered symbol by a complex conjugate of channel gain that corresponds to the estimated channel response such that phase shift of a channel carrying the received spread spectrum baseband sample is compensated and multiple paths of the channel are proportionally weighted based on corresponding signal strengths.

32. The spread spectrum radio of claim 31, wherein the channel matched filter further comprises:
plurality of delay elements operably coupled to produce a series of delayed despread baseband symbols by delaying the despread baseband symbol;
plurality of multipliers operably coupled to the plurality of delay elements, wherein the plurality of multipliers multiply the series of delayed despread baseband symbols with a plurality of coefficients representing the complex conjugate of the channel gain to produce a plurality of filtered symbol components; and
summing module operably coupled to sum the plurality of filtered symbols to produce the filtered symbol.

33. The spread spectrum radio of claim 27, wherein the channel response determination module further comprises:
finite impulse response filter module operably coupled to perform a least mean square (LMS) algorithm on the reconstructed spread spectrum complex baseband sample in accordance with converging channel coefficients to produce to a finite impulse response (FIR) output;
summing module operably coupled to sum the FIR output with the delayed spread spectrum complex baseband sample to produce an error signal; and
channel coefficient converging module operably coupled to produce the converging channel coefficients based on the error signal.

34. The spread spectrum radio of claim 33, wherein the FIR filter module further comprises:
plurality of delay elements operably coupled to delay the reconstructed spread spectrum complex baseband sample to produce delayed reconstructed spread spectrum complex baseband samples;
plurality of multiplying modules operably coupled to the plurality of delay elements, wherein the plurality of multiplying modules multiple the converging channel coefficients with the delayed reconstructed spread spectrum complex baseband samples to produce a plurality of FIR output components; and
summing module operably coupled to sum the plurality of FIR output components to produce the FIR output.

35. The spread spectrum radio of claim 34, wherein the channel coefficient converging module further comprises:
plurality of multiply-accumulate modules operably coupled the plurality of delay elements, wherein the each of the multiply-accumulate modules multiplies a corresponding one of the delayed reconstructed spread spectrum complex baseband samples with the error signal to produce a current resultant and accumulates the current resultant with at least one previous resultant to produce a corresponding one of the converging channel coefficients.

36. The spread spectrum radio of claim 35, wherein the channel coefficient converging module further comprises:
step size module operably coupled to adjust step size of the error signal.

* * * * *

UNITED STATES PATENT AND TRADEMARK OFFICE
CERTIFICATE OF CORRECTION

PATENT NO. : 7,301,993 B2 Page 1 of 1
APPLICATION NO. : 10/243857
DATED : November 27, 2007
INVENTOR(S) : Brima D. Ibrahim and Prasanna Desai It is certified that error appears in the above-identified patent and that said Letters Patent is hereby corrected as shown below:

Column 13, Claim #1, Line 64
"matched further module" should read --matched filter module--

Column 14, Claim #5, Line 46
"marched" should read --matched--

Column 14, Claim #6, Line 56
"marched" should read --matched--

Column 15, Claim #11, Line 61
"The" should read --the--

Column 16, Claim #13, Line 15
"The" should read --the--

Signed and Sealed this

Eleventh Day of March, 2008

JON W. DUDAS
*Director of the United States Patent and Trademark Office*

UNITED STATES PATENT AND TRADEMARK OFFICE
CERTIFICATE OF CORRECTION

PATENT NO.       : 7,301,993 B2  
APPLICATION NO. : 10/243857  
DATED            : November 27, 2007  
INVENTOR(S)      : Brima Ibrahim et al.

Page 1 of 1

It is certified that error appears in the above-identified patent and that said Letters Patent is hereby corrected as shown below:

Column 16, line 17, in Claim 13: replace "The" with --the--.

Column 17, line 44, in Claim 21: replace "marched" with --matched--.

Column 19, line 17, in Claim 28: replace "marched" with --matched--.

Column 19, line 23, in Claim 29: replace "marched" with --matched--.

Signed and Sealed this

Seventeenth Day of February, 2009

JOHN DOLL  
*Acting Director of the United States Patent and Trademark Office*